US012178226B2

(12) United States Patent
Dake et al.

(10) Patent No.: US 12,178,226 B2
(45) Date of Patent: Dec. 31, 2024

(54) BROTH COMPOSITION AND METHOD OF USING SAME

(71) Applicant: INTERNATIONAL DEHYDRATED FOODS, INC., Springfield, MO (US)

(72) Inventors: Roger Lynn Dake, Springfield, MO (US); Nancy Lewis, Aurora, MO (US)

(73) Assignee: INTERNATIONAL DEHYDRATED FOODS, INC., Springfield, MO (US)

( * ) Notice: Subject to any disclaimer, the term of this patent is extended or adjusted under 35 U.S.C. 154(b) by 418 days.

(21) Appl. No.: 17/832,946

(22) Filed: Jun. 6, 2022

(65) Prior Publication Data

US 2023/0071696 A1 Mar. 9, 2023

Related U.S. Application Data

(62) Division of application No. 16/511,942, filed on Jul. 15, 2019, now Pat. No. 11,350,652, which is a division of application No. 14/850,405, filed on Sep. 10, 2015, now Pat. No. 10,349,669.

(60) Provisional application No. 62/048,648, filed on Sep. 10, 2014.

(51) Int. Cl.
| A23L 13/50 | (2016.01) |
| A23J 1/00 | (2006.01) |
| A23J 1/06 | (2006.01) |
| A23L 13/30 | (2016.01) |

(52) U.S. Cl.
CPC ............... *A23L 13/50* (2016.08); *A23J 1/002* (2013.01); *A23J 1/06* (2013.01); *A23L 13/30* (2016.08); *A23V 2002/00* (2013.01)

(58) Field of Classification Search
CPC . A23L 13/30; A23L 13/50; A23J 1/002; A23J 1/06; A23V 2002/00
See application file for complete search history.

(56) References Cited

U.S. PATENT DOCUMENTS

| 2,963,376 | A | 12/1960 | Hogan et al. |
| 3,445,448 | A | 5/1969 | Mccann |
| 3,795,751 | A | 3/1974 | Dunn et al. |
| 3,796,811 | A | 3/1974 | Huth et al. |
| 3,920,853 | A | 11/1975 | Middendorf |
| 3,947,598 | A | 3/1976 | Stenne |
| 4,113,884 | A | 9/1978 | Krasovec et al. |
| 4,176,199 | A | 11/1979 | Vollmer et al. |
| 5,073,394 | A | 12/1991 | Dake et al. |
| 5,086,166 | A | 2/1992 | Lawhon |
| 5,162,129 | A | 11/1992 | Anderson et al. |
| 5,487,909 | A | 1/1996 | Zabel et al. |
| 5,487,910 | A | 1/1996 | Zabel et al. |
| 5,780,841 | A | 7/1998 | Bakker et al. |
| 6,342,252 | B1 | 1/2002 | Song et al. |
| 7,070,953 | B1 | 7/2006 | Bjarnason et al. |
| 10,349,669 | B2 | 7/2019 | Dake |
| 10,555,967 | B2 | 2/2020 | Dake |
| 10,694,767 | B2 | 6/2020 | Dake |
| 10,694,768 | B2 | 6/2020 | Dake |
| 10,757,957 | B2 | 9/2020 | Dake |
| 11,039,634 | B2 | 6/2021 | Dake |
| 11,350,652 | B2 * | 6/2022 | Dake ..................... A23J 1/002 |
| 2003/0008056 | A1 | 1/2003 | Henry |
| 2005/0037109 | A1 | 2/2005 | Soerensen et al. |
| 2005/0170060 | A1 | 8/2005 | Raghavan et al. |
| 2009/0238930 | A1 | 9/2009 | Sathivel |
| 2011/0183060 | A1 | 7/2011 | Kuramoto |
| 2011/0250316 | A1 | 10/2011 | Scheide-Fischer et al. |
| 2012/0171345 | A1 | 7/2012 | Kelleher et al. |
| 2012/0258236 | A1 | 10/2012 | Cruz Serna et al. |
| 2013/0266686 | A1 * | 10/2013 | Morskate ............. A23K 20/147 426/2 |
| 2016/0066068 | A1 | 3/2016 | Schultz et al. |
| 2016/0066611 | A1 | 3/2016 | Dake et al. |
| 2016/0135480 | A1 * | 5/2016 | Rutt ..................... A23L 33/195 426/619 |
| 2017/0196238 | A9 * | 7/2017 | Rutt ..................... A23K 20/147 |
| 2019/0000127 | A1 | 1/2019 | Lynch |
| 2020/0061101 | A1 | 2/2020 | Dake |
| 2020/0116686 | A1 | 4/2020 | Bertini et al. |
| 2020/0275677 | A1 | 9/2020 | Dake |
| 2020/0345034 | A1 | 11/2020 | Dake |

FOREIGN PATENT DOCUMENTS

| CN | 103 665 371 A | 3/2014 |
| EP | 0180281 A2 | 5/1986 |
| EP | 0 535 135 A1 | 4/1993 |
| FR | 2218060 A1 | 9/1974 |
| JP | 46-042190 | 12/1971 |
| JP | H09121819 A | 5/1997 |
| JP | 2000-014357 | 1/2000 |
| JP | 2002045154 A | 2/2002 |
| JP | 2013-106607 | 6/2013 |
| KR | 820001071 B1 | 6/1982 |
| WO | WO 94/01003 A1 | 1/1994 |
| WO | WO 01/28353 | 4/2001 |
| WO | WO 2019/028269 A2 | 2/2019 |

OTHER PUBLICATIONS

European Patent Application No. 15840487.1 Communication pursuant to Article 94(3) EPC dated Mar. 1, 2024.
European Patent Application No. 15840487.1, Extended European Search Report and Opinion dated Jun. 20, 2018, 11 pgs.
PCT Patent Application No. PCT/US2015/049406 International Search Report and Written Opinion, dated Nov. 30, 2015, 20 pages.
Japanese Patent Application No. 2017-513245, English translation of Office Action dated Jul. 10, 2019, 11 pages.

(Continued)

*Primary Examiner* — Anthony J Weier
(74) *Attorney, Agent, or Firm* — Cozen O'Connor

(57) ABSTRACT

Showb here is a process for preparing a concentrated liquid composition (such as a broth) from poultry or other meat sources without the use of any enzymes. The resultant composition may have high content of solids but are pumpable or pourable and have relatively long shelf life at room temperature. Also shown are methods of extracting proteins from raw poultry or other meat sources at relatively low temperatures. Methods of making a high protein curd is also shown.

6 Claims, 1 Drawing Sheet

(56) References Cited

OTHER PUBLICATIONS

Maeda (2005) "A seasoning, a seasoning extract. It uses also as original functional stock. Production technology of the zymolysis extract which uses a chicken bone as a raw material" Food Stuff Industry, vol. 48, No. 23, pp. 62-67.
European Patent Application No. 17814127.1; Communication pursuant to Article 94(3) EPC dated Jul. 28, 2020; 5 pgs.
Li et al. (2007) "Removal of suspended solids from tuna spleen extract by microfiltration: a batch process design and improvement," Biochemical Engineering Journal, Elsevier, Amsterdam, NL, vol. 38, No. 2, pp. 226-233.
Canadian Patent Application No. 2,960,402, Office Action dated Aug. 20, 2021, 3 pages.
European Patent Application No. 17814127.1, Communication pursuant to Article 94(3) EPC dated Jul. 29, 2021, 4 pages.
Japanese Patent Application No. 2020-114631, English translation of Notice of Final Rejection dated Jan. 21, 2021, 5 pages.
U.S. Appl. No. 14/698,332, Office Action dated Jun. 9, 2021, 22 pages.
Japanese Patent Application No. 2020-114631; Notice of Reasons for Rejection dated Sep. 9, 2020; 6 pages.
European Patent Application No. 15840487.1, Communication pursuant to Article 94(3) EPC dated May 11, 2020, 5 pp.
Mexican Patent Application No. MX/a/2018/015673; Office Action dated Jan. 25, 2022.
Canadian Patent Application No. 2,960,402; Examination Report dated Feb. 4, 2022.
Japanese Patent Application No. 2017-513245, English translation of Office Action dated Mar. 2, 2020, 5 pages.
PCT Patent Application No. PCT/US21/57133 International Search Report and Written Opinion, dated Mar. 18, 2022, 13 pages.
U.S. Appl. No. 14/698,332; Office Action dated Nov. 28, 2022; 17 pgs.

\* cited by examiner

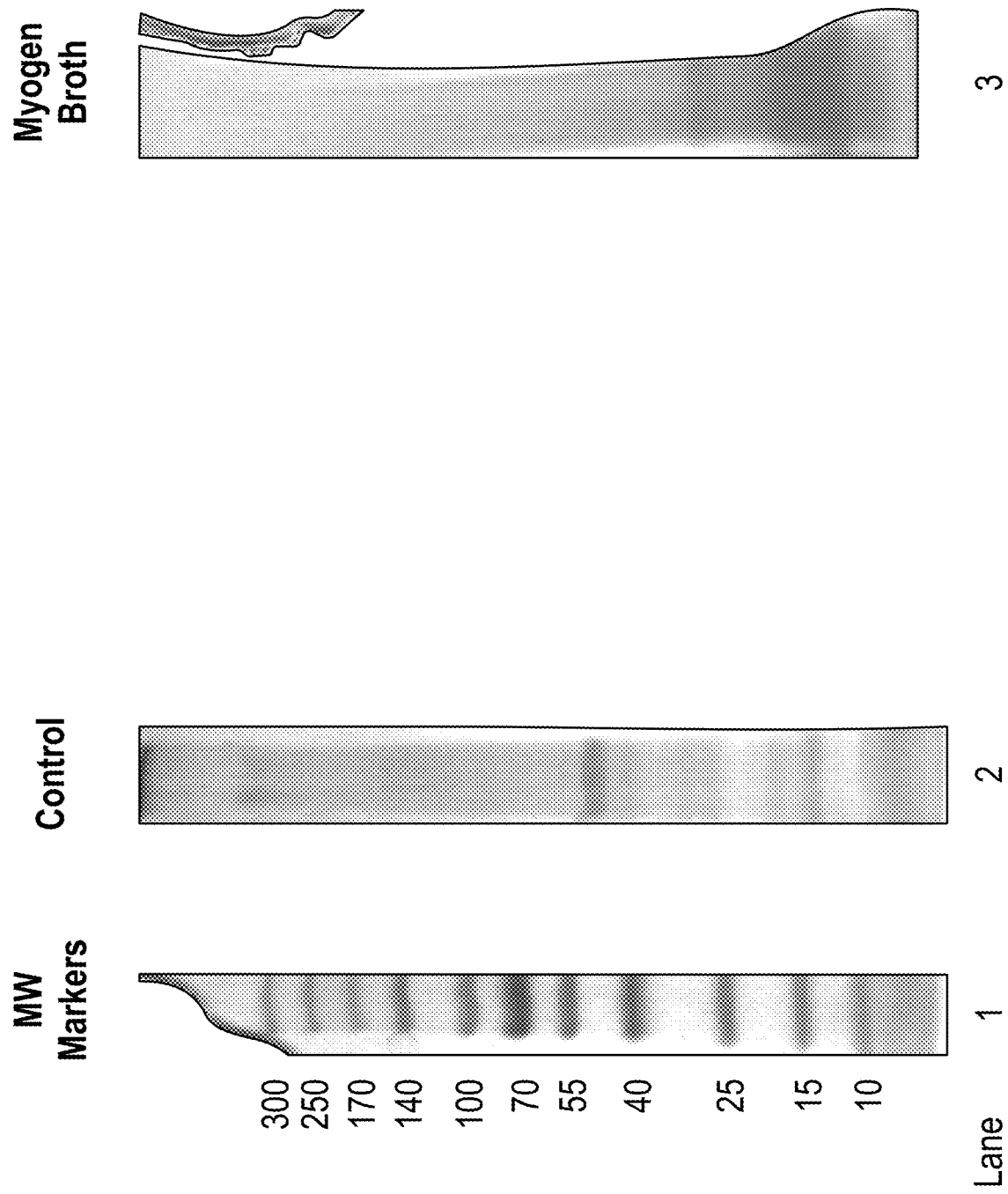

BROTH COMPOSITION AND METHOD OF USING SAME

RELATED APPLICATION

This application is a divisional of U.S. patent application Ser. No. 16/511,942, filed Jul. 15, 2019, now U.S. Pat. No. 11,350,652, which is a divisional of U.S. patent application Ser. No. 14/850,405, filed Sep. 10, 2015, now U.S. Pat. No. 10,349,669, which claims priority to U.S. Provisional Patent Application No. 62/048,648, filed Sep. 10, 2014, the entire contents of which are hereby incorporated by reference into this application.

BACKGROUND

1. Field of the Invention

This disclosure relates to a process for making a broth composition. More particularly, the disclosure relates to a pumpable composition prepared from poultry or other meat sources without using an enzyme.

2. Description of Related Art

Broth or soups prepared from animals have high nutrition values. They are rich in proteins and have been shown to possess both nutritional and therapeutic values.

Many existing methods for making concentrated broth fail to efficiently utilized the broth derived from the meat processing industry. For instance, some methods fail to produce a concentrated stock or broth that is pumpable or pourable. Broth that is not pumpable or pourable is difficult to process. Poor utilization of the broth not only causes economical waste but also generates excessive waste water and environmental pollutions.

SUMMARY

The instrumentalities disclosed herein overcome the problems outlined above by providing a pumpable broth composition having high percentage of solids and relatively long shelf life. In another embodiment, the disclosure also provides a cold raw extraction prepared from various meat sources. In another embodiment, the present disclosure also provides a protein curd composition prepared from various meat sources.

In one embodiment, the higher solids of the disclosed concentrated broth composition may help control microbial growth and prevent spoilage of the broth products. In another embodiment, no non-poultry ingredient other than water is introduced into the composition. In another embodiment, no extraneous enzymes are added to the composition or used in the process of making the product.

In one embodiment, a process is disclosed for making a broth composition that is pumpable or pourable. In another embodiment, the broth composition may be in a concentrated form, with at least 50%, 60%, 70%, 80%, or 90% solids.

In another embodiment, a raw extraction process is disclosed which may include at least the following steps: (a) mixing one or more poultry or animal parts with water, (b) incubating the mixture of (a) at a temperature between −20° C. and 70° C. for at least 10 minutes to generate a suspension, (c) separating the suspension from step (b) into a liquid fraction and a solid fraction, and (d) collecting the liquid fraction from step (c) to obtain the extract.

In one aspect, the temperature for step (a) may be between −10° C. and 40° C., between 0° C. and 25° C., or between 5° C. and 15° C. In another aspect, the incubation time of step (a) may be at least 5 minutes, 10 minutes, or at least 30 minutes. In another aspect, the incubation of step (a) may be accompanied by stirring, mixing, etc. The poultry or animal part may be selected from the group consisting of mechanically separated poultry (MSP), mechanically separated chicken (MSC), poultry trims, animal meat trims, ground poultry parts, ground animal parts and combination thereof. In another aspect, the ratio between the poultry or animal part and water in the extraction is between about 1:1 to 1:4 by weight. The raw poultry or animal meat extract obtained according to this process may be subject to further processing described below, such as concentration, cooking, membrane separation, among others.

In another aspect, the separation step (c) may be performed by centrifugation, or filtration of the suspension. In another aspect, the centrifugation may be conducted at a speed of 1,000 rpm, 2,000 rpm, 3,000 rpm, 4,000 rpm. In another aspect, the centrifugation may be conducted at a speed lower than 10,000 rpm.

In another embodiment, a process is disclosed which may include at least the following steps: (a) incubating a raw liquid material at a temperature between about 50° C. and 160° C. for a period of at least 30 minutes to generate a suspension containing liquid and solid components, (b) separating the liquid component of the suspension from the solid component of the suspension, and (c) collecting the liquid component from step (b). In one aspect, the raw liquid material may be incubated in step (a) at a temperature ranging from 50° C. to 160° C., or more specifically, at least 60° C., 70° C., 80° C., or 90° C., or over 100° with corresponding pressure and the period of incubation may be at least 0.5 hour, 1 hour, 2 hours, 4 hours, 8 hours, or at least 24 hours. The raw liquid material may be at least one member selected from the group consisting of poultry sarcoplasm, blood from poultry or other animals, raw poultry or animal meat extract as described above, animal sarcoplasm, and combination thereof. As used herein, the term "animal" may include all mammals, birds, fish, reptiles and amphibians.

In another embodiment, the composition prepared from raw extraction of poultry contains relatively low levels of hydroxyproline. By way of example, the levels of hydroxyproline as a percentage of total amino acids in the composition may be as low as 2%, 1%, 0.5%, 0.2% or less, 0.1% or less, 0.01% or less.

In one aspect, the liquid component from step (c) may be subject to a concentration step (d), where the liquid component is boiled or is subject to a evaporation process to reduce the volume. The concentration step may help prepare a concentrated broth composition that contains high solids, for example, at greater than 50%, 60%, 70%, 80% solids. In another aspect, such composition may be stable at room temperature for at least 12 months, 24 months, 36 months, 48 months, 60 months, or longer. In another aspect, the composition obtained from step (d) may have less than 0.85, 0.75, 0.7, 0.6 or 0.5 water activity.

The raw liquid material may be derived from chicken, turkey, beef, pork or other animal or poultry sources. In one embodiment, the raw liquid material may be in a substantially liquid form which contains significant amount of poultry sarcoplasm. The term "substantially liquid form" means that the raw liquid material is mostly liquid but may contain minor amount of insoluble material. For instance, the raw liquid material may be collected from a poultry processing plant or from a poultry storage container or package. In another embodiment, one type of the raw liquid material typically exudes from cut and exposed muscle or bone tissues, which is also known as muscle serum or myogen. In another embodiment, the raw liquid material may appear reddish because it may contain intercellular, and/or intracellular liquid, sarcoplasm, and/or sarcoplasmic reticulum with its muscle pigment myoglobin, proteins, minerals, and metabolites. In another embodiment, the raw liquid material may be blood or plasma obtained from poultry or other animals.

In another embodiment, the raw liquid material may be obtained by extracting raw mechanically separated poultry (MSP), mechanically separated chicken (MSC), or finely ground poultry pieces (such as poultry trims or ground poultry parts) with water. By way of example, the extraction may be conducted by adding water into raw MSC. The mixture can then be stirred to facilitate mixing and extracting. The ratio between the MSC and water in the extraction mixture may range from about 4:1 to about 1:20 by weight, from about 1:1 to about 1:4 by weight, or about 1:2 by weight. In another embodiment, the MSC and water mixture may be subject to centrifugation at the end of the extraction. The liquid phase resulting from the centrifugation may be collected and used as the raw liquid material for preparing the pumpable broth composition of the present disclosure.

The raw liquid material may be prepared on-site and may be used for making the composition right after it is made fresh on-site. Alternatively, the raw liquid material may be from packaged products or may be collected off-site.

After the incubation of step (a) where the raw liquid material is incubated at an elevated temperature, the suspension may be subject to filtration to separate the liquid component from the solid component of the suspension, for example, by pouring through a 200 mesh sieve. In another aspect, fat may be further removed from the liquid component. For instance, the liquid phase may be cooled down or refrigerated to allow the fat to form a fat layer on top of the liquid phase. The top fat layer may then be removed by scooping or by other decanting methods known in the art.

In another embodiment, the raw liquid material may be cooked at an elevated temperature, e.g., 50-160° C. for a period of time such that an insoluble protein curd is formed. In one aspect, this insoluble protein curd may be separated from the liquid component and may be used in various food products. For example, the protein curd may be used as a source of protein, or in a snack. In another aspect, the protein curd may be used as is, or may be processed into powder.

In another embodiment, the liquid component obtained in step (c) may be subject to a concentration step (d). In one aspect, concentration may be accomplished by boiling. In another aspect, the concentrating step may be accomplished by evaporation. In another aspect, liquid component obtained in step (c) may be subject to membrane separation to further remove certain undesirable proteins, peptides, compounds, or lipids, or to enrich certain desirable proteins, peptides, compounds, or lipids. In another aspect, membrane separation may help enrich one or more peptides or proteins in the extract.

In another embodiment, the disclosed composition obtained from step (d) has relatively low water activity. By way of example, the water activity of the final product may be less than 0.85, or even less than 0.8, 0.7, or 0.6. In one aspect, salt may added to the composition to further reduce the water activity. The salt may be added to the composition prior to step (d), during step (d), or after performance of step (d). Examples of salt may include but are not limited to NaCl, or other edible salts. For example, about 5 percent of salt may be added to a product that is 40% solids to achieve about 0.83 water activity.

Reduced water activity in the final broth product may help reduce microbial growth during storage and transportation. As a result, no anti-microbial agents or preservatives need to be added into the broth during or at the end of the process. Because anti-microbial agents and preservatives may be perceived negatively by consumers, avoidance of these substances may add to the marketability of the broth products. In one embodiment, nitrogen or other inert gases may be used during packaging to modify the head space in order to prevent growth of mold or bacteria.

The reduction of water activity may also simplify the packaging process of the final product. More specifically, because the broth composition obtained from step (d) contains little water to support microbial growth, sterile conditions may not be required when packaging the composition of the instant disclosure. In another aspect, the shelf life of the final broth composition obtained in step (d) may be at least 6 months, at least 12 months, at least 24 months, or at least 36 months at room temperature. By way of example, the shelf life of the final broth composition may be 12-24 months, 12-36 months, 24-36 months, or 36-48 months at room temperature.

In another embodiment, the composition prepared according to the instant disclosure has relative higher amount of Guanosine-5'-Monophosphate and Inosine-5'-Monophosphate. In one aspect, the total amount of Guanosine-5'-Monophosphate and Inosine-5'-Monophosphate is at least 25% of the total nucleotides in the composition. In another aspect, more than 70%, or even 80% of total proteins in the composition have a molecular weight (MW) below 30 kiloDalton (KD).

In another embodiment, the composition prepared according to the instant disclosure is pumpable or pourable, which is advantageous for packaging and handling. For instance, the broth may contain at least 50%, 60%, 70%, 80%, or 85% solids but is still pourable (or pumpable) at room temperature.

In one embodiment, the disclosed composition may be packed in a squeezable or pumpable bottle and may be used by consumers at home or at any public places, such as restaurants. In another embodiment, the disclosed composition may be packed in a container, such as a bulk container, a trailer tanker, or a railroad tanker for transportation. In one aspect, the container may have a headspace, and the air in the headspace may be replaced with a gas having reduced oxygen content to prevent growth of molds. Suitable gases may include but are not limited to nitrogen, carbon dioxide, or inert gas.

BRIEF DESCRIPTION OF THE DRAWINGS

FIG. 1 shows the protein profile of the Myogen broth prepared according to a disclosed method.

DETAILED DESCRIPTION

The present disclosure relates to cold raw extraction prepared from various meat sources. The present disclosure also relates to pumpable compositions prepared from various meat sources. The present disclosure also relates to protein curd compositions prepared from various meat sources. In one aspect, the disclosed broth product is pumpable, flowable and pourable. In another aspect, the disclosed pumpable composition has higher solids than many other products prepared according to existing methods Another advantage afforded by the instant methods is the relatively longer shelf life of the resulting broth product.

In one embodiment, one or more enzymes may be added in the raw extraction process. In one aspect, the enzyme may include, for example, proteases. In another aspect, the temperature of the raw extraction may be at about 50-60 C. Both the addition of enzymes and elevation of temperature may help increase the amount of essential amino acids that are included in the extracted fractions.

In another embodiment, the raw extraction process may further include an acidification step (f) to reduce the pH of the soluble protein composition obtained from step (e). In another embodiment, the acidification step (f) may include adding an acidic agent to the broth layer obtained from step (e) or partially hydrolyzing the broth layer, wherein the acidic agent is selected from the group consisting of carbonated water, carbon dioxide gas, and combination thereof. In one aspect, acid hydrolysis may help removing fat (lipid) from the composition. In another aspect, acid hydrolysis may facilitate selective fractionation of proteins and improve amino acid profiles, especially to increase the content of essential amino acids The terms "poultry part" and "animal part" refer to parts of the bird or animal, as well as whole bird or whole animal.

The term "broth" refers to an aqueous composition containing at least one solute. A broth may be a liquid, a solution, or a suspension. For purpose of this disclosure, the term "broth" may be used interchangeably with the terms "stock," "extract," "fond," or "demi-glace." It is to be recognized that as a broth becomes more and more concentrated, it may become highly viscous and may have much lower liquidity as compared to a dilute broth. The concentrated broth composition of the present disclosure may be a highly concentrated broth in a liquid form. Alternatively, a concentrated broth composition may be a dried or semi-dried broth product in the form of powder or paste.

For purpose of this application, the terms "pumpable" and "pourable" may be used interchangeably to refer to the fluidic characteristics of a composition which can be transferred by using a device (e.g., a pump) typically used in the food (e.g., broth) packaging industry or which can be poured from one container into another.

The term "water activity" refers to unbound water in a material, for example, food. Water that is not bound to food molecules can support the growth of bacteria yeast or molds (fungi). Thus, water activity may be used to indicate the inherent tendency by which certain food material may become contaminated or spoiled.

The range of water activity may extend from 0 (bone dry) to 1.0 (pure water). Most food products have a water activity level in the range of 0.2 for very dry foods to 0.99 for moist fresh foods. In practice, water activity is usually measured as equilibrium relative humidity (ERH). The water activity of fresh meat is typically about 0.99, while the water activity of aged cheddar cheese is about 0.85. Dried food usually has lower water activity. For instance, most dried fruit products have water activity of about 0.6, while dry milk powder has water activity of about 0.2.

The terms "agent," "ingredient," "component," and "constituent" may be used interchangeably in this disclosure. The term "enrich" means to increase the concentration of a component in a mixture that contains more than one components.

The compositions of the present disclosure may contain additional ingredients. It is to be understood that these additional ingredients may confer upon the disclosed compositions certain desirable properties. Examples of such desirable properties may include but are not limited to enhanced inhibition of spoilage microorganisms, improved flavor, or increased stability of the composition, and so on.

It is to be noted that, as used in this disclosure, the singular forms "a," "an," and "the" include plural referents unless the context clearly dictates otherwise. Thus, for example, reference to "a composition" includes reference to two or more of such compositions.

In another embodiment, the disclosed compositions may be prepared and/or distributed in a concentrated form. A concentrate may be dissolved or dispersed in a solvent to form a reconstituted solution.

EXAMPLES

The following examples are provided to illustrate the present invention, but are not intended to be limiting. The reagents, materials and instruments are presented as typical components, and various substitutions or modifications may be made in view of the foregoing disclosure by one of skills in the art without departing from the principle and spirit of the present invention.

Example 1 Preparation of Pumpable Broth from Raw Liquid Sarcoplasm

Raw liquid was collected in a poultry manufacturing plant from totes of raw chicken frames. This liquid has been identified as primarily liquid sarcoplasm that exudes from cut and exposed muscle tissue, and is also known as muscle serum or myogen. This reddish liquid is a natural part of muscle tissue and is often seen in grocery store packages of raw meat and poultry. When fully cooked, the red color disappears and the product takes on the appearance of broth.

A quantity of this raw liquid was collected and weighed into a large stock pot. It was fully cooked at a simmer for about an hour at 85-99° C., and the resultant liquid broth was separated from insoluble solids through a 230 mesh sieve. This broth portion was concentrated by boiling down (reducing) on stove top for several hours to yield an extract with high solids. Upon reaching 57% solids, a sample was taken and the water activity of the sample was determined to be at 0.79. The remainder of the extract was further concentrated to 73% solids with a water activity of 0.59. Both samples had less than 0.85 in water activity and were considered shelf stable. Both samples were very flowable and pumpable upon cooling.

Example 2 Preparation of Pumpable Broth from Raw Mechanically Separated Chicken

Freshly made raw mechanically separated chicken (MSC) was obtained from a poultry plant. Portions of the MSC were weighed into cooking pots and two parts cold water was added into the MSC. Each batch was mixed enough to break up lumps. Then, the raw slurry was centrifuged at 3,500 rpm for 5 minutes and separated into a bottom meaty, insoluble phase, a large liquid phase in the middle, and a thin fat layer on top. The liquid phase and the fat layer were separated from the meaty phase by pouring. The liquid phase and fat layer were then cooked on stove top at 85-99° C. for about an hour. After cooking, the liquid broth obtained was separated from insoluble solids by pouring through a 230 mesh sieve. Fat was removed by cooling overnight in a refrigerator and simply scooping off the solidified fat. The broth was concentrated by boiling down (reducing) on stove top.

This concentrated broth was sampled and shown to have 57.4% solids with a water activity of 0.77. This sample remains very flowable, pourable, and pumpable at ambient temperature.

The procedure above was repeated and similar results were obtained. An extract was obtained that was shown to be 48.8% solids with a water activity of 0.83, which is considered shelf stable with no need of refrigeration.

Example 3 Chemical Analysis of the Composition

The composition prepared according to Example 1 (referred to as Myogen Broth) was subject to chemical analysis to determine the content of nucleotides and amino acids. A chicken broth prepared by conventional method (referred to as Home-style Broth) was used as control. The amount of total nucleotides in the Myogen Broth after corrected on solid basis was 3855.66 mg/100 grams By contrast, the amount of total nucleotides in the Home-style Broth after corrected on solid basis was 2461.08 mg/100 grams. These results indicated that the total nucleotides in the Myogen Broth is about 56% (or at least 50%) greater than the total nucleotides in Home-style Broth. The amounts of each nucleotide as a percentage of total nucleotides for Myogen Broth and Home-style Broth are shown in Table 1, respectively. The amounts of each amino acid as a percentage of total amino acids for Myogen Broth are shown in Table 2.

TABLE 1

NUCLEOTIDE CONTENT

| Percentage of total Nucleotides % | Myogen Broth | Home-style Broth |
| --- | --- | --- |
| Adenosine-5'-Monophosphate | 2.0 | 9.2 |
| Cytidine-5'-Monophosphate | 1.7 | 3.3 |
| Uridine-5'-Monophosphate | 70.5 | 64.3 |
| Guanosine-5'-Monophosphate | 0.88 | 1.2 |
| Inosine-5'-Monophosphate | 24.8 | 21.9 |

TABLE 2

AMINO ACID CONTENT

| Amino acid | Percentage of total amino acids % |
| --- | --- |
| Aspartic acid | 0.77 |
| Threonine | 0.45 |
| Serine | 0.47 |
| Glutamic acid | 2.68 |
| Glycine | 1.25 |
| Alanine | 1.01 |
| Valine | 0.49 |
| Methionine | 0.25 |
| Isoleucine | 0.39 |
| Leucine | 0.67 |
| Tyrosine | 0.31 |
| Phenylalanine | 5.04 |
| Lysine | 0.85 |
| Histidine | 1.15 |
| Arginine | 0.61 |
| Proline | 0.89 |
| Hydroxyproline | 0.20 |
| Cysteine | 0.11 |
| Tryptophan | 0.10 |

The same Myogen broth was also subject to SDS-PAGE analysis to determine the molecular weight distribution of proteins in the composition. As shown in FIG. 1, more than about 70%, or 80% of the total proteins have a MW below 30 KD.

Example 4 Preparation of a High-Protein, Low-Ash Solid Composition

To prepare a solid high-protein, low-ash composition, in Test 1, about 10 pounds of raw mechanically separated chicken (MSC) was extracted with about 20 pounds of solution of water and chicken broth. The raw liquid fraction was separated from the more solid fraction using a centrifuge. Fat was mostly removed from the decanted liquid. The liquid was then fully cooked to about 80° C. for at least 10 minutes. Upon cooking, an insoluble protein curd formed in the liquid which was separated from the liquid with a screen. The curd was pressed in the screen by hand to remove excess liquid. The resultant protein curd was analyzed. The results are shown below in Table 3. The resultant curd was high in moisture (72.2%) and proportionally high in protein (19.2%) and low in ash (0.77%). Calculated to a dry or solids basis, the product had about 61% protein, 36% fat, and 2.5% ash.

TABLE 3

ANALYSIS RESULT OF HIGH PROTEIN CURD OBTAINED IN TEST 1

| | | | | Dry: | | |
| --- | --- | --- | --- | --- | --- | --- |
| Moisture | Protein | Fat | Ash | Protein | Fat | Ash |
| 72.2 | 19.2 | 11.1 | 0.77 | 61.8 | 35.7 | 2.48 |

In Test 2, 10 pounds of raw MSC (6° C.) was mixed with 20 pounds of ice water. Solids were separated from liquid using a centrifuge resulting in 19 pounds of liquid. The separated liquid was cooked with stirring to greater than 80° C. for more than 10 minutes, resulting in a clear chicken broth fraction and formation of an insoluble protein curd. The curd was separated from the liquid broth using a standard No. 230 sieve with hand pressing, then analyzed in the lab. Table 4 shows the results of the analysis.

TABLE 4

ANALYSIS RESULT OF HIGH PROTEIN CURD OBTAINED IN TEST 2

| | | | | Dry: | | |
| --- | --- | --- | --- | --- | --- | --- |
| Moisture | Protein | Fat | Ash | Protein | Fat | Ash |
| 68.7 | 19.0 | 9.8 | 0.6 | 64.6 | 33.4 | 2.0 |

The amino acid content of the protein curd is shown in Table 5.

TABLE 5

AMINO ACID CONTENT

| Amino acid | Percentage of total amino acids % |
| --- | --- |
| Aspartic acid | 10.22 |
| Threonine | 4.54 |
| Serine | 4.31 |
| Glutamic acid | 12.58 |
| Glycine | 4.57 |
| Alanine | 5.89 |
| Valine | 6.11 |
| Methionine | 2.40 |
| Isoleucine | 4.82 |
| Leucine | 8.86 |
| Tyrosine | 3.59 |
| Phenylalanine | 5.52 |

TABLE 5-continued

AMINO ACID CONTENT

| Amino acid | Percentage of total amino acids % |
|---|---|
| Lysine | 8.03 |
| Histidine | 3.53 |
| Arginine | 6.46 |
| Proline | 5.62 |
| Hydroxyproline | 0.01 |
| Cysteine | 1.42 |
| Tryptophan | 1.53 |

To test the nutritional values of the protein curd, a quantity of the protein curd prepared according to Test 2 above was fed to rats along with control animal protein diet, and the growth of the rats was monitored and compared to rats fed with other animal protein products. The weight gain and growth of the test group was very close to the control group fed with standard animal protein products.

Example 5 Preparation of Beef Curd from Beef Materials

Two beef raw materials were processed by the cold raw extraction method as described in the above examples. These raw materials contain similar components of raw liquid with some fat and raw insoluble meaty solids. The raw liquid extract phase was fully cooked at >85° C. for more than 10 minutes. The protein curd formed after cooking was separated from the broth phase by screening. The curd was pressed by hand on a fine screen to reduce moisture, then analyzed for protein and fat. Samples were also sent to a commercial lab for amino acid analyses.

The first raw material was from a Commercial Finely Textured Reduced Fat Beef product, and the resultant protein curd had 15.8% protein and 6.2% fat (on a dry basis 71.8% protein and 28.2% fat).

The second raw material was from standard ground beef purchased in a local supermarket. The protein curd prepared from this sample had 13.4% protein and 3.7% fat (on a dry basis 78.4% protein and 21.6% fat).

Both curd samples on a dry basis score a perfect 100 on PDCAAS score. Table 6 shows PDCAAS of beef protein curd made from raw extraction of the first sample. Values entered are the amino acid test results converted to a solids basis. The PDCAAS is 100 based on egg white or casein standard.

TABLE 6

AMINO ACID CONTENT OF BEEF CURD PREPARED FROM RAW BEEF PRODUCT

| Amino acid | Percentage of total amino acids % |
|---|---|
| Aspartic acid | 10.2 |
| Threonine | 4.3 |
| Serine | 4.1 |
| Glutamic acid | 12.0 |
| Glycine | 4.9 |
| Alanine | 5.9 |
| Valine | 5.3 |
| Methionine | 2.6 |
| Isoleucine | 4.3 |
| Leucine | 9.5 |
| Tyrosine | 3.3 |
| Phenylalanine | 4.9 |
| Lysine | 11.0 |
| Histidine | 4.3 |
| Arginine | 5.4 |

TABLE 6-continued

AMINO ACID CONTENT OF BEEF CURD PREPARED FROM RAW BEEF PRODUCT

| Amino acid | Percentage of total amino acids % |
|---|---|
| Proline | 5.0 |
| Hydroxyproline | 0.1 |
| Cysteine | 1.4 |
| Tryptophan | 1.5 |

The beef protein curd samples had a mild flavor and an amorphous, soft texture and had a mottled (light and dark) appearance. Protein digestibility as measured by the standard pepsin digestibility method was at 98.8%.

Changes may be made in the disclosed compositions and methods without departing from the scope hereof. It should thus be noted that the matter contained in the above description should be interpreted as illustrative and not in a limiting sense. The following claims are intended to cover all generic and specific features described herein, as well as all statements of the scope of the present methods and compositions, which, as a matter of language, might be said to fall therebetween.

The contents of all cited references (including literature references, patents, patent applications, and websites) that may be cited throughout this application are hereby expressly incorporated by reference in their entirety for any purpose, as are the references cited therein.

The invention claimed is:

1. A composition prepared from poultry or other animal parts through a process comprising:
   (a) mixing said poultry or other animal parts with water,
   (b) incubating the mixture of (a) at a temperature between −20° C. and 70° C. for at least 10 minutes to generate a suspension,
   (c) separating said suspension into a liquid fraction and a solid fraction, and
   (d) collecting said liquid fraction from step (c) to obtain said composition,
wherein no extraneous enzyme is added in the process, said composition comprising more than 50% protein on a solid basis, said composition comprising less than 2% (w/w) hydroxyproline as a percentage of total amino acids in said composition, wherein more than 70% of proteins in said composition have a molecular weight (MW) below 30 kiloDalton (KD).

2. The composition of claim 1, wherein said composition is pumpable at room temperature when said composition is concentrated to more than 60% solids.

3. The composition of claim 1, wherein said composition does not contain any extraneous enzyme.

4. The composition of claim 1, wherein said poultry or animal part is selected from the group consisting of mechanically separated poultry (MSP), poultry trims, animal meat trims, ground poultry parts, ground animal parts and combination thereof.

5. A method of using the composition of claim 1, wherein said composition is pumpable, and said pumpable composition is packed in a container selected from the group consisting of a squeezable bottle, a squeezable tube, a pumpable bottle, a bulk container, a trailer tanker, and a railroad tanker.

6. The method of claim 5, wherein said container has a headspace, and wherein air in said headspace is replaced with a gas selected from the group consisting of nitrogen, carbon dioxide, inert gas, and combination thereof.

\* \* \* \* \*